United States Patent [19]

Bütikofer

[11] Patent Number: 5,382,606
[45] Date of Patent: Jan. 17, 1995

[54] CURING AGENT FOR AQUEOUS EPOXY RESIN DISPERSIONS, PROCESS FOR ITS PREPARATION AND ITS USE

[75] Inventor: Pierre-André Bütikofer, Hittnau, Switzerland

[73] Assignee: Sika AG, vorm. Kaspar Winkler & Co., Zurich, Switzerland

[21] Appl. No.: 53,426

[22] Filed: Apr. 28, 1993

[30] Foreign Application Priority Data

Apr. 28, 1992 [CH] Switzerland ............... 1355/92-8

[51] Int. Cl.$^6$ ............... C08K 3/20; C08L 63/02
[52] U.S. Cl. ............................................. 523/404
[58] Field of Search ............................. 523/404

[56] References Cited

U.S. PATENT DOCUMENTS 3,629,181 12/1971 Heer et al. ............................. 528/88
3,758,421 9/1973 Nikles ................................. 528/111

OTHER PUBLICATIONS

Encyclopedia of Polymer Science and Technology, 1967, pp. 226-227.

Primary Examiner—Melvyn I. Marquis
Assistant Examiner—D. Aylward
Attorney, Agent, or Firm—Burns, Doane, Swecker & Mathis

[57] ABSTRACT

A curing agent for aqueous epoxy resin emulsions is described, which curing agent contains 10–80% by weight of at least one emulsifier, 1–80% by weight of at least one coemulsifier, and 5–80% by weight of at least one bis(diamine)-diepoxide adduct. Optionally, the curing agent furthermore contains 0–80% by weight of a diamine or a mixture of two or more diamines. Said curing agent has the ability of forming microemulsions when water is added, preferably non-ionic oil-in-water microemulsions. Said microemulsions have a good shelf life. They are useful as curing agent for any desired aqueous epoxy resin dispersions, and they can also be used as curing agent in compositions based on epoxy resin and cement mortar.

19 Claims, No Drawings

CURING AGENT FOR AQUEOUS EPOXY RESIN DISPERSIONS, PROCESS FOR ITS PREPARATION AND ITS USE

BACKGROUND OF THE INVENTION

It is well known in the art that the epoxy-group has the ability of reacting with compounds which have an active hydrogen atom, like e.g. with alcohols, phenols, acids, amines or mercapto compounds, according to the following reaction scheme:

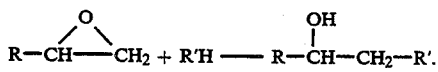

Therefore, epoxy resins can be crosslinked to yield polymeric products with such crosslinking agents which comprise reactive hydrogen atoms, and nowadays as curing agents for epoxy resins there are used for example the following substances which have active hydrogen atoms:

dicarboxylic acids and polycarboxylic acids, polyalcohols, polyphenols, diamines and polyamines and polymercaptanes. With regard to this, reference is made to Ullmann's "Encyklopädie der technischen Chemie" (Encyclopedia of the technical Chemistry), volume 10, 1975, pages 567–577, and specially to page 570, table 6, in which the different crosslinking reactions are illustrated schematically.

In spite of the great number of curing agents which are described in the prior art for curing epoxy resins, several of said systems are not suited, if the epoxy resin will be present in a specific form or formulation, for instance as epoxy resin dispersion, respectively the curing agents described in the prior art are not satisfactory when the epoxy resin is intended to be used in a certain field of application.

Said problems are severe if the curing of the epoxy resin has to be performed in a system which contains further components, like e.g. fillers, pigments, emulsifying agents and similar constituents. If the epoxy resin is used in a system which contains inorganic binders, like cement or lime, and eventually further additives, like for instance additives for concrete, then additional difficulties are to be encountered, because of the alkaline properties of said inorganic binders, and because of the further components which usually are present in such compositions. To sum up, until now there was not yet available a curing agent which fulfilled all the set requirements.

On the other hand, it is desired to improve certain technological properties of mortars, specially cement containing mortars, like concrete, by adding certain additives, including polymeric materials, like plastic materials and resins. Through the addition of such further additives, for instance the following properties should be improved, respectively imparted to the composition.

- a good workability of the composition, while maintaining an advantageous water/cement value.
- the prevention of separation processes, like the settling of components, the segregation or bleading out of components, like aqueous solutions, and the undesired development of a cement layer on the surface.
- an increasing of the water retaining ability.
- an increased resistance to harmful substances from the environment, like carbonates and salts, like defrosting salts.
- an excellent adherence to old surfaces or concrete and other usual undergrounds in the construction field, like on iron, even if the layers to be applied are thin.

It is well known in the art since many years to add to cement mortars polymeric materials which are thermoplastics. In the following table there are stated the years since when about the corresponding thermoplastic materials had been added to cement mixtures, and in said table furthermore also the disadvantages are mentioned shortly, which said products usually exhibit:

| since about the year | thermoplastic material and its disadvantages |
| --- | --- |
| 1950 | polyvinylacetate-polymerizates. They however are quickly saponified under the highly alkaline conditions of the cement suspension. |
| 1958 | styrene-butadiene-polymers. They however have only a low stability if submitted to an irradiation with ultraviolet light. |
| 1970 | styrene-acrylate-polymers. They have a sufficient stability against saponification and also when submitted to an irradiation with ultraviolet light. |

Through the addition of dispersions of the above mentioned thermoplastic polymers, it was possible to develop several polymer modified cement mortars which are designated as "Polymer Cement Concrete products" and abbreviated as "PCC-products". The corresponding products have several advantageous properties if compared with corresponding products which were prepared without adding said dispersions of thermoplastic materials. Said products are comfortable in use and not too expensive. Cement mortars, however, very often are submitted to rather severe environmental conditions, like e.g. large variations of temperature, exposures to water, ultraviolet light and different chemical substances and similar influences, and the corresponding products which had been prepared by adding thermoplastic dispersions sometimes have severe disadvantages if submitted to said conditions for longer periods.

Dispersions of thermoplastic material usually contain emulsifiers, protective colloids and/or coalescing agents, and therefore they are susceptible to a microbial attack during the storage period, and frequently even after the curing of the accordingly prepared construction material, provided that said construction material is used in a rather humid environment.

It is well known for a person experienced in the art that through the environment and the influence of weather, construction materials are exposed to drastic variations of the temperature, and also in as far as said temperature changes are concerned, the PCC-products often do not meet the set requirements.

Most of the dispersions of thermoplastic materials are soft at the temperature of use. The glass-transition temperature, which is abbreviated as $T_G$ usually is in the range of $+30°$ C. to $-30°$ C. Often the minimal film forming temperature, which is abbreviated as "MFT" of such thermoplastic materials, is improved by adding coalescing agents which result in a swelling of the thermoplastic material. The corresponding coalescing agents are usually specially selected organic solvents with low volatility, which organic solvents however should evaporate by and by from the corresponding constructions material as soon as the film had been formed. It however was found out that said coalescing agents can no longer evaporate to the desired degree from the formed films of the thermoplastic material if rather thick layers of the construction material had been applied. Even if a polymeric material is used which has a rather high glass-transition temperature, then the corresponding film of the thermoplastic material maintains its softness due to the reasons outlined above.

If the thermoplastic material which is added to the mortar or the concrete is a dispersion which contains an acrylate, then a further disadvantage is to be found in the already mentioned problems of a saponification of the ester groups, through which carboxylic acid groups are formed, if the corresponding mortar or concrete is submitted to water or humidity for long periods, and said carboxylic acid groups make the corresponding thermoplastic polymer more hydrophilic and result in a swelling of the polymer and thereby it gets still more soft.

The above mentioned undesired properties of such mortars to which dispersions of thermoplastic materials had been added, probably are the reason why it was tried already since about the year 1960 to use as additive to mortar or concrete, instead of thermoplastic materials, corresponding dispersions of epoxy resins.

DESCRIPTION OF THE PRIOR ART

Dispersions of epoxy resins have been used for a long time and successfully as layers which are applied to substrates of different kind, for instance as coating materials. The curing agents which are used for said dispersions of epoxy resins contain usually large amounts of such components which have a strong emulsifying activity. When the corresponding epoxy resin dispersions are cured, however said components which have the emulsifying activity are incorporated into the corresponding polymeric material through cross-linking reactions, at least to a higher extent or nearly completely, so that in the corresponding cured resin there are present only small amounts of free emulsifying agents.

Films which are prepared using such disperions of epoxy resins, are of horny nature. They have glass-transition temperatures of up to about 50° C., and the corresponding cured films are swelling only to a low extent, even if they are exposed to strongly alkaline aqueous media. The above mentioned properties of such dispersions of polymeric materials would be highly desirable provided that the corresponding dispersions are intended to be used as additive for cement or mortar. Nevertheless, however, the first tests which were made in order to provide combinations of aqueous epoxy resin dispersions and curing agents, preferably aqueous dispersions of curing agents, in corresponding systems in order to improve the technological properties of concrete and mortar, were not successful.

The reasons for the difficulties which were encountered seem to be rather complicated. The processes which result in a curing of the mortar are for instance adversely and drastically influenced through additives which are usually used in the field of the epoxy resins.

Many curing agents as well as curing systems for epoxy resins are available in the market which have a good emulsifying activity, respectively which are available already diluted with water. The good emulsifying properties of the corresponding curing agents are provided through the addition of amine components which have hydrophilic properties, as well as hydrophobic properties, and examples of such amine components are modified fatty-acid-amide-polyamines, polyacrylates with terminal amino, respectively acid-amide groups, and isocyanate adducts or epoxy resin adducts, which have amino groups as substituents. If an acid is added to the corresponding amines, they are converted into cationic emulsifiers. Corresponding curing agents for epoxy resins are for instance described in the following patents:

U.S. Pat. No. 3,956,208
DE 2,627,070
U.S. Pat. No. 4,123,402
JP 54,148,025
U.S. Pat. No. 4,179,418
EP 10,318
JP 58,023,823
U.S. Pat. No. 4,489,179
U.S. Pat. No. 4,539,347 and furthermore also in the volume "Epoxy Resins-Chemistry and Technology" of C. A. May, Ed., Marcel Dekker, Inc. Basle 1988, page 498.

Said well-known curing agents and curing systems, however are not adapted for such dispersions of epoxy resins which are intended to be used as additives for cement mortar. The corresponding systems have strongly alkaline properties due to the presence of inorganic binders (for example cement and/or fly ash) and in said alkaline environments from the above mentioned cationic emulsifying agents which are salts of amines, the free amines are liberated. Said chemical conversion of the cationic emulsifier makes the emulsions instable, and the corresponding emulsions brake. Said problems are still more severe if in the cement mortar mixtures there are present several kinds of usual additives, like water reducing agents, high range water reducing agents, antifoaming agents and similar products. Some of the curing agents and curing systems which are described in the above stated publications, furthermore, have ester groups which are rapidly saponified in the alkaline environment of said mixture.

The corresponding mixtures of mortar accordingly do not have the desired properties during the working steps and after they had hardened.

In the published German patent application 2 106 320 there are described coating systems and paints, the essential components of which are a water dilutable dispersion of an epoxy resin and a curing agent. The corresponding curing agent is an amine which is modified with fatty-acid derivatives, and the dispersion of the epoxy resin and/or the curing agent has to be dispersed with two emulsifiers, whereby one of said emulsifiers has to be dispersible in water and the other one water soluble. The preferred curing agents disclosed in said German patent application are reaction products of polyalkylene polyamines with monomeric or dimeric or trimeric fatty-acids (see claim 4).

In the published French patent application 2 541 295, there is described a process according to which a mixture of an epoxy resin and an amine curing agent is applied, together with reinforcing materials onto stone plates. As examples for curing agents there are mentioned the addition products of an epoxide with an amino amide, and said addition product is optionally mixed with a condensation product of phenol and formaldehyde and amine. The preferred curing agent is an addition product of epoxy resins with condensation products of monomeric fatty-acids and an excess of amines, and as example for said amine component there is mentioned among others ethylene diamine (see claims 3 and 4). From said publication there, however, cannot be taken any reference that the corresponding curing agent should be used mixed with certain emulsifiers and also the epoxy resins which are cured according to said publication, obviously are no emulsions of epoxy resins.

In the DATABASE WPI, Derwent Publications Ltd., London (GB), Class A 23, AN 79-46821B & SU-A-620495 (Lengd Road Res Inst), there are described compositions for coating road surfaces which are prepared without performing a heating step. The corresponding compositions contain a cationic emulsion of a bituminous binder, and they are cured with a combination of epoxy resin with a hardener. No reference can be found in said publication that either the hardener or the epoxy resin should be used as emulsion, and the curing of the epoxy resin is retardened through the addition of aqueous solutions of hydrochloric acid.

In the published German patent application 2 815 706 there are described cement containing compositions to which water soluble epoxy resins are added. The corresponding water soluble epoxy resins are selected from the group which comprises polyglycidyl-ethers of polyols which are combined with aqueous polyalkylene-polyamines. As examples of polyol components, there are mentioned polyglycerol, trimethylol-propane, penta-erythritol, polygycols and similar polyols, and the aqueous polyalkylene-polyamine components are usually selected from the group which comprises diethylene-triamine, which will be abbreviated in the future as "DETA", triethylenetetramine, which will be abbreviated in the future as "TETA", and similar amines. Through the addition of said aqueous epoxy resins to the cement compositions, the mechanical properties thereof are improved clearly. It however is also possible from the technical point of view to add to the cement compositions such hydantantoin-epoxy resins which are already described in the Swiss patent 471 811, as components used in formulating adhesives for humid concrete.

The above mentioned systems, however, have some severe disadvantages which make it impossible to use them in several fields of application. It is for example not possible to dilute the resins with water during a long time before they are used, because corresponding water diluted resins hydrolize during the storage, and get by and by useless. Furthermore, the pot-life is usually very short, because the water which has to be added prior to the use, accelerates the reaction between the amine and the epoxide to a high degree. Some time ago, aqueous mixtures of dimethylhydantoin-diglycidyl-ether and polyamines had been used for strengthening, respectively the solidification of sand-stone or rotten wood, and in said field of application the pot-life of the corresponding mixtures was extended through the addition of higher amounts of acids. An acid containing mixture, however, cannot be added to cement or mortar containing mixtures because of the adverse influence of the acid onto the chemical processes which occur when the corresponding mixtures begin to cure. Furthermore, nearly all the resins of the above stated kind must no longer be used for making constructions, because the products are rather toxic.

A disadvantage which is to be found when water soluble polyamines are used in combination with epoxy resin dispersions is that said polyamines have a great tendency to brake the emulsions.

It is possible to produce water soluble polyamine-epoxy-resin-adducts which in principle do not react too quickly with the epoxy resin if they are used without adding an acid, and which furthermore do not directly provoke a breaking of the corresponding dispersions.

Nevertheless, also such systems soon get instable, because the colloidal particles have the tendency to adhere to the hydrophobic resin molecules, and a fast bonding and a flocculation is to be observed.

At the end of the seventies a new family of curing agents was developed which for the first time made it possible to use epoxy resin dispersions as addivitive for formulating mortars. Said mortars had improved properties if compared with mortars which had been modified through the addition of dispersions of thermoplastic materials.

The above mentioned construction materials nowadays are still available in the market and used in special fields of application, and in English speaking countries they are named "epoxy-cement-concrete" and based on an abbreviation of said designation, all over the world, they are usually named "ECC-mortars". The properties of said ECC-mortars were e.g. investigated by C. H. Conrad, and in the following course of instructions "Lehrgang Nr. 4487/80.127 der Technischen Akademie Esslingen, 1991" a summary is given of what is known about said ECC-mortars.

In the European patent 00 605 B1 there are described curing agents which can be used with rather good results in such ECC-mortars. Said curing agents are prepared by synthesizing first a resin preproduct starting from a polyethylene glycol which has an average molecular weight $M_r$ of about 1000 g/mol, which is reacted with an excess of a mixture of bisphenol-A/F-diglycidylethers. During said procedure there has to be present a suitable catalyst which is a Lewis-acid, and the reaction requires high temperatures and long reaction times. Furthermore, the polyethylene-glycol starting material has hygroscopic properties, and it has to be dried thoroughly before it can be used for the performance of said reaction, because if water is present, there are formed undesired by-products which result in curing agents which do not meet the set requirements.

The resin preproduct prepared according to said process is accordingly a polyethylene glycol having an epoxy terminal group which is present in the excess of the epoxy resin. Said resin preproduct is reacted in a second reaction step with an excess of diamines and thereafter diluted with water until the product has a content of 80% of solids. Finally, a part of the primary amino groups of said product is submitted to an addition reaction with acrylonitrile, and said primary amino groups are converted to secondary amino groups through said addition of the vinyl groups. In said patent there are disclosed curing agents which according to examples 1A to 3C thereof have the following composition, if referred to 100% of said curing agent:

about 45 % (corresponding to about 14 mol-%) of a bis(diamine-diepoxide)-polyethylene glycol-adduct which acts as emulsifying agent, about 35% (corresponding to about 32 mol-%) of a bis(diamine)-epoxy resin-adduct, about 20% (corresponding to about 48 mol-%) of bis(acrylonitrile)-diamine-adduct, <5% of free diamine.

Said curing agents can be added to mortar compositions. They may even contain usual additives, like for instance high range water reducing agents and if the corresponding curing agents are diluted with water until a solid content of about 20% solids is reached no coalescing occurs provided that the temperature is maintained below about 35° C. This, however, is an essential drawback of said products, because if flow mortars are to be prepared, the formulation is extremely difficult. Furthermore, in the course of the preparation of said curing agent, the first reaction step is rather critical, and it therefore is usually not possible to produce said curing agent while maintaining always the same properties or quality thereof.

In the European patent application 387 418 A2, there is described a process through which the rather difficult synthesis of the polyether-modified resin preproduct should be simplified by starting the process with a polyethylene-glycol which has terminal amino groups, i.e. with a product which is sold with the trademark Jeffamine ® ED by the company TEXACO. Said process, however, is not new. For instance there was already described in the European patent application EP 109 173 B1 an adduct of Jeffamine ® to an exoxy resin. The corresponding resin pre-products, however, are only storable for very short periods because the tertiary amino groups which are contained in said products result in a by and by gel formation due to their catalyzing activity onto ether forming reactions. The corresponding preproduct, therefore, is reacted in a second reaction step with an excess of diamines to form corresponding adducts, and said second reaction step is performed in an analogous way as the one which is already described in the European patent 000 605. According to most of the examples, said second reaction step is as well performed using acrylo nitrile. In the present case, however, contrary to the reaction described in the European patent 0605 the product is not diluted with water before the performance of the corresponding reaction with the acrylo nitrile, i.e. the 2-cyano-ethylation. In the present case, however, the acrylo nitrile is first reacted with an excess of the diamine to yield a diamine-cyano acrylate adduct. Said adduct then is reacted with the resin preproducts and finally diluted with water to yield a solid content of 80%.

Typical compositions of the corresponding products are stated in the following table:

| Components | Example 11 % | Example 11 mol-% | Example 17 % | Example 17 mol-% |
|---|---|---|---|---|
| Tetrakis - (diamine-diepoxide) Jeffamine adduct which acts as emulsifying agent | about 49 | 5 | about 50.0 | 4.5 |
| bis(diamine)resin adduct | 16 | 10 | 2.5 | 1.0 |
| acrylonitrile-diamine-mono-adduct | — | — | 31.0 | 49.0 |
| free diamine | 35 | 85 | 16.5 | 45.5 |

It is interesting that there was used a bisphenol-A-diglycidylether which has an epoxy equivalent of 163 g per equivalent. The stated "amine equivalents" are surprisingly high in all the stated curing agents which contain acrylonitrile, and it is therefore assumed that with the term "amine equivalent" there are meant the equivalents of active hydrogen or the NH-equivalents expressed in g per equivalent. Due to the rather high quantities of free diamines and of acrylonitrile adducts present in the corresponding curing agents, said products have a rather low viscosity at a solid content of 80%. Nevertheless, the viscosity of a mixture of a dispersion of 50% of resin and 50% of curing agent is usually far higher than desired. Furthermore, it is not possible to dilute said curing agents to a solid content of only 20%, and therefore said curing agents usually cannot be used as curing agents for ECC mortars. The low water dispersibility, furthermore, renders any cleaning operations which are necessary to clear the tools after the working steps, rather difficult.

It was the aim of the present invention to provide curing agents which are dilutable with water, and which do not have the above mentioned disadvantages of the curing agents described in the prior art.

The curing agents should e.g. fulfill the following requirements:

a simple method for preparing the curing agent, e.g. according to a one pot process. The temperatures required in the process should not be too high (<100° C.).

the use of any starting materials which are highly toxic, like e.g. acrylonitrile, ethylene-imine and similar products, should be avoided.

the use of organic solvents should be avoided.

the curing agents should be storable even if diluted to a solid content of about 20% at temperatures of up to 50° C. for long periods, without coalescing.

It surprisingly was found out that said aims could be fulfilled with the inventive curing agents which contain at least one emulsifier, at least one coemulsifier and furthermore at least one bis(diamine)-diepoxide adduct.

DESCRIPTION OF THE INVENTION

One object of the present invention is a curing agent for aqueous epoxy resin dispersions, which contains amino groups and is characterized in that it comprises the following components:

10–80 % by weight of at least one emulsifier which comprises in its molecule at least one polyalkylene-polyether-diamine-group which corresponds to formula I

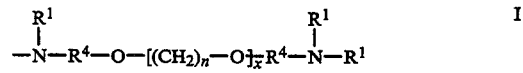

in which the radicals $R^1$ are independently from each other hydrogen atoms or straight chain or branched chain alkyl residues having 1–6 carbon atoms or straight chain or branched chain alkyl radicals having 1–6 carbon atoms which are substituted with one or more phenyl residues, the residues $R^4$ are independently from each other alkylene groups having 1–8 carbon atoms, n is an integer in the range of 1–5, and x is an integer in the range of 8–90, 1–80 % by weight of a coemulsifier, which comprises in its molecule at least one polyalkylene polyamine group of formula II

in which group the residues $R^1$ and the symbol n have independently from each other the same meaning as outlined above, for the groups having the formula I and y is an integer in the range of 1-6, and 5-80 % by weight of at least one bis(diamine)-diepoxide- adduct which comprises in its molecule at least two amino-alcohol groups of formula III

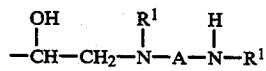   III in which $R^1$ has the same meaning as in formula I, and

A is an alkylene residue, a cycloalkylene residue, a polyalkylene-polyether-residue or a bivalent residue which comprises alkyl groups as well as cycloalkyl groups and/or aromatic groups.

The inventive curing agent optionally contains as further component a diamine or a mixture of two or more diamines in an amount of up to 80% by weight of diamine referred to the total weight of the curing agent. Preferred diamines which are optionally present in the curing agents are diamines which comprise two primary amino groups.

In preferred inventive curing agents the remaining part of the molecule of the emulsifier to which the polyalkylene-polyether-diamine group of formula I is bonded, and the remaining part of the molecule of the coemulsifier, to which the polyalkylene-polyamine group of formula II is bonded, have a similar structure, optionally even the remaining parts of the emulsifier and the coemulsifier are identical.

In preferred inventive curing agents the group I of the emulsifier is bonded to a structure which corresponds to formula IV

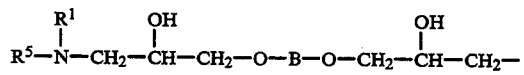   IV in which $R^5$ is a long chain aliphatic residue, preferably an alkyl residue having 7-25 carbon atoms or an aliphatic polyamine residue which corresponds to the following formula

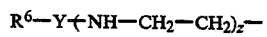

in which $R^6$ is an alkyl residue having 7-25 carbon atoms,

A is a direct linkage or a bivalent group of formula

and z is an integer in the range of 1-4,

B is an alkylene residue, an alkylene residue which is interrupted in its alkylene chain through one or more ether oxygen atoms, or a bivalent cycloaliphatic or aromatic or araliphatic residue and $R^1$ is selected from the group comprising hydrogen or straight chain or branched alkyl residues having 1-6 carbon atoms and phenyl substituted straight chain or branched alkyl residues which have 1-6 carbon atoms in the alkyl moiety.

In preferred inventive curing agents furthermore in the coemulsifier the polyalkylene-polyamine-group having the formula II is bonded to a structure which corresponds to the following formula IV

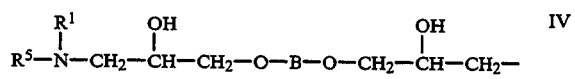   IV in which $R^5$ is a long chain aliphatic residue, preferably an alkyl residue having 7-25 carbon atoms or an aliphatic polyamine residue which corresponds to the following formula

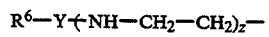

in which $R^6$ is an alkyl residue having 7-25 carbon atoms,

Y is a direct linkage or a bivalent group of formula

and z is an integer in the range of 1-4, and

B is an alkylene residue or an alkylene residue the carbon chain of which is interrupted through one or more ether oxygen atoms or a bivalent cycloaliphatic or aromatic or araliphatic residue, and $R^1$ is selected from the group comprising hydrogen atoms or straight chain or branched alkyl residues comprising 1-6 carbon atoms and phenyl substituted alkyl radicals comprising 1-6 carbon atoms in the alkyl moieties.

Optionally in the corresponding curing agents the structure of formula IV to which the group I of the emulsifier is bonded, is even identical to the structure of formula IV to which the group of formula II of the coemulsifier is bonded.

In preferred inventive curing agents furthermore in the bis(diamine)-diepoxide adduct the two groups of formula III are bonded to a bivalent structure which corresponds to the following formula V

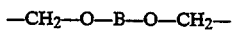   V in which bivalent structure

B is an alkylene residue or an alkylene residue, the carbon chain of which is interrupted through one or more ether oxygen atoms, or a bivalent cycloaliphatic or aromatic or araliphatic residue, and in said bis(diamine)-diepoxide furthermore the two groups corresponding to formula III stated before, which are bonded to said bivalent structure of formula V, have the same structure or a structure which differs from each other.

As already outlined before, optionally the inventive curing agent contains as further component a diamine or a mixture of two or more diamines, and preferably such diamine comprising caring agents contain the following components in the percentages by weight stated below, referred to the total weight of said curing agent:

10-80% by weight of the at least one emulsifier, 1-80% by weight of the at least one coemulsifier, 5-80% by weight of the at least one bis(diamine)-diepoxide-adduct, and 1-80% by weight of the diamine or the mixture of two or more diamines.

Preferred diamines which are optionally present as further components in the inventive curing agents, are such diamines which contain per molecule two primary amino groups, and preferably said diamines correspond to the following formula IV $$H_2N-B-NH_2 \qquad VI$$

wherein in said formula VI

B is an alkylene residue or an alkylene residue the carbon chain of which is interrupted through one or more ether oxygen atoms, or a bivalent cycloaliphatic or aromatic group or a bivalent residue which comprises alkyl as well as cycloalkyl and/or aromatic groups.

A further object of the present invention is a process for the preparation of the inventive curing agents, which process is characterized in that either the following components are mixed with each other:

10-80% by weight of at least one emulsifier which contains in its molecule at least one polyalkylene-polyether-diamine group having the formula I, 1-80% by weight of at least one coemulsifier which comprises in its molecule at least one polyalkylene-polyamine-group having the formula II, and 5-80% by weight of at least one bis(diamine)-diepoxide-adduct which comprises in its molecule at least two epoxid-diamine-adduct groups of formula III, or that said mixture is prepared directly according to a one-pot procedure.

In said process there is optionally added as further component 1-80% by weight of a diamine.

It furthermore was found out that surprisingly the inventive curing agents easily form non-ionic micro-emulsions if water is added, and preferably the corresponding micro-emulsions are oil in-water micro-emulsions.

According to a preferred embodiment of the process for preparing the inventive curing agent, there is furthermore added water in order to produce the curing agent in the form a corresponding micro-emulsion.

According to a preferred embodiment of the process described above, there is prepared such an emulsifier in which the polyalkylene-polyether-diamine-group of formula I $$\underset{|}{-N}-R^4-O-[(CH_2)_n-O\frac{}{x}R^4-\underset{|}{N}-R^1 \qquad I$$
$$\phantom{-N}R^1 \phantom{-R^4-O-[(CH_2)_n-O\frac{}{x}R^4-N}R^1$$

is bonded to a structure which corresponds to the following formula IV $$R^5-\underset{|}{N}-CH_2-\underset{|}{CH}-CH_2-O-B-O-CH_2-\underset{|}{CH}-CH_2- \qquad IV$$
$$\phantom{R^5-N}R^1 \phantom{-CH_2-}OH \phantom{-CH_2-O-B-O-CH_2-}OH$$

wherein in the polyalkylene-polyether-diamine-group of formula I the residues $R^1$, $R^4$ and the symbols n and x have the same meaning as defined before, and wherein furthermore the symbol n is preferably the integer 2 or 3, and wherein in the structure IV $R^5$ is a long-chain aliphatic residue, preferably an alkyl residue having 7-25 carbon atoms, or an aliphatic polyamine residue which corresponds to the following formula $$R^6-Y(NH-CH_2-CH_2)_{\overline{z}}$$

in which formula $R^6$ is an alkyl residue having 7-25 carbon atoms,

Y is a direct linkage or the bivalent group of formula $$\underset{\|}{-C-},$$
$$\phantom{-}O$$

and z is an integer in the range of 1-4, and

B is an alkylene residue or an alkylene residue the carbon chain of which is interrupted through one or more ether oxygen atoms or a bivalent cycloaliphatic or aromatic or araliphatic residue, and which process is performed by reacting an alkyl monoamine and/or an alkylpolyamine which corresponds to the following formula VII $$R^5-\underset{|}{N}-H \qquad VII$$
$$\phantom{R^5-}R^1$$

with a diepoxide which corresponds to the following formula VIII $$\overset{O}{\underset{CH_2}{\diagup\diagdown}}CH-CH_2-O-B-O-CH_2-\overset{O}{\underset{CH}{\diagup\diagdown}}CH_2 \qquad VIII$$

as well as a polyalkylenepolyetherdiamine which corresponds to the following formula IX $$H-\underset{|}{N}-R^4-O-[(CH_2)_n-O\frac{}{x}R^4-\underset{|}{N}-R^1. \qquad IX$$
$$\phantom{H-}R^1 \phantom{-R^4-O-[(CH_2)_n-O\frac{}{x}R^4-}R^1$$

According to a further preferred embodiment of the process, there is prepared a coemulsifier, in which the polyalkylenepolyamine group of formula II $$-\underset{|}{N}-[(CH_2)_n-N\frac{}{y}R^1 \qquad II$$
$$\phantom{-}R^1 \phantom{-[(CH_2)_n-}R^1$$

is bonded to a structure which corresponds to the following formula IV $$R^5-\underset{|}{N}-CH_2-\underset{|}{CH}-CH_2-O-B-O-CH_2-\underset{|}{CH}-CH_2- \qquad IV$$
$$\phantom{R^5-N}R^1 \phantom{-CH_2-}OH \phantom{-CH_2-O-B-O-CH_2-}OH$$

and wherein in the polyalkylenepolyamine group of formula II the residues $R^1$ and the symbols n and y, have the same meaning as defined before, and in the structure of formula VI the residue $R^5$ is a long-chain aliphatic residue, preferably an alkyl residue which comprises 7-25 carbon atoms, or an aliphatic polyamine residue which corresponds to the following formula

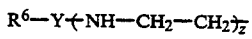

in which
R⁶ is an alkyl residue having 7-25 carbon atoms,
Y is a direct linkage or a bivalent group of formula

and
z is an integer in the range of 1-4,
B is an alkylene residue or an alkylene residue the carbon chain of which is interrupted through one or more ether oxygen atoms, or a bivalent cycloaliphatic or aromatic or araliphatic residue, and wherein said coemulsifier is prepared by reacting an alkylmonoamine or an alkylpolyamine which corresponds to the following formula VII

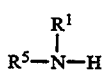         VII with a diepoxy compound of formula VIII

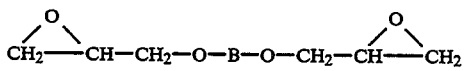   VIII as well as with a polyalkylenepolyamine which corresponds to the following formula X

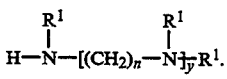   X

According to a further preferred embodiment of the inventive process, there is prepared a curing agent which contains such a bis(diamine)-diepoxide adduct, which comprises in its molecule two epoxide-diamine adduct groups which correspond to the following formula III

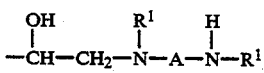   III which two groups of formula III are bonded to a bivalent structure which corresponds to the following formula V

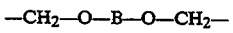   V and wherein in the epoxide diamine adduct groups of formula III the groups
R¹ and A have the same meaning as defined previously and in the bivalent structure of formula V
B is an alkylene residue or an alkylene residue the carbon chain of which is interrupted through one or more ether oxygen atoms or a bivalent cycloaliphatic or aromatic or araliphatic residue,
and wherein the two groups of formula III which are bonded to said bivalent structure of formula V are different from each other or identical to each other and, wherein said bis(diamine)-diepoxide adduct is prepared by reacting one or more diamines which correspond to the following formula XI

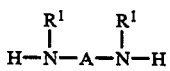   XI with a diepoxide which corresponds to the following formula VIII

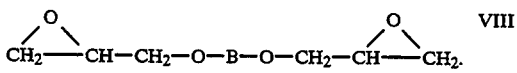   VIII

It is advantageous that the inventive curing agent can be prepared according to a one pot process and such a proceeding is specially advantageous if the preferred curing agents mentioned above are prepared in which the emulsifier, the coemulsifier and/or the bis(diamine)-diepoxide adduct have in their molecular structure groups which are similar to each other or identical with each other.

There can be seen from the processes described above, that for the preparation of the preferred emulsifier component of the inventive curing agent, there is necessary as starting material a diamine which corresponds to the following formula IX

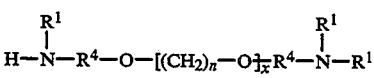   IX and furthermore for the preparation of the preferred coemulsifier which is used as component in the inventive curing agent, there is needed as starting material a polyamine which corresponds to the following formula X

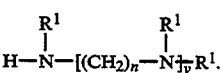   X

The corresponding diamines of formula IX and polyamines of formula X are preferably prepared in situ by performing a reducing alkylation of amines through reacting them with aldehydes and formic acid.

According to the inventive process for the preparation of the inventive curing agent, the different adducts can be prepared either separately and thereafter mixed with each other or the different adducts can be produced according to a one pot procedure one after the other. In each of the outlined cases the preparation is preferably performed at a temperature of 20° to 120° C., and specially preferred at a temperature of 50° to 90° C.

A further object of the present invention is a use of the inventive curing agent for the curing of polyfunctional aqueous epoxy resin dispersions, and said use is characterized in that the curing agent is mixed with the aqueous epoxy resin dispersion.

According to a preferred use an aqueous epoxy resin dispersion which optionally contains as further components fillers and/or pigments, is mixed with such an inventive curing agent which contains as further component water, and which is present in the form of a microemulsion, preferably as oil-in-water microemulsion. After the mixing of the epoxy resin dispersion with said aqueous microemulsion of the curing agent, the curing process starts and the corresponding mixture is applied onto a substrate or is used for filling cavities or voids.

According to a further preferred embodiment of the inventive use, such an inventive curing agent which comprises as further component water, and is present in the form of a microemulsion, preferably as oil-in-water microemulsion, is used for curing an aqueous epoxy resin dispersion, which dispersion is used as additive to such a construction material which contains as further component an inorganic binder, selected from the group which consists of cement, lime, gypsum and mixtures of such inorganic binders, and wherein said construction material optionally contains water, particulate additives, like sand or gravel, and further additives which are usually present in concrete or mortar. The construction materials which contain the inorganic binder and which can be improved through the addition of an epoxy resin dispersion and an inventive curing agent which is a microemulsion, usually contain at least one further component, which is selected from the group which consists of water-reducers, high-range water-reducers, air entraining agents, curing accelerators and curing retarders for the inorganic binder, e.g. cement, which is contained in the mixture, and furthermore fly ash, blast-furnace slag, burnt oil shale, amorphous silicon dioxide, like silica fume, and thixotroping agents. Contrary to curing agents according to the prior art which usually cannot be used in combination with construction materials which contain further components selected from the above stated group, the inventive curing agents are not adversely influenced by such components.

The inventive curing agents have the ability of forming spontaneously microemulsions when mixed with water, and said microemulsions can be either oil-in-water microemulsions which will be designated in the future as o/w-microemulsions, or they form water-in-oil microemulsions, which will be designated in the future also as w/o-microemulsions.

Contrary to aqueous solutions of amines, the water containing inventive curing agents demonstrate the Tyndall effekt. If irradiated with daylight from the side, the corresponding microemulsions have a bluish appearance. If daylight is transmitted through the microemulsions, they however are yellowish. The average particle size of microemulsions is smaller than a quarter of the wave length of the visible light. The well-known macroemulsions of the prior art are usually prepared by mixing the oil phase with water plus an emulsifier. The inventive curing agents however have to contain compulsorily an emulsifier plus a coemulsifier in order to yield microemulsions when mixed with water.

In a similar way as it is well-known for microemulsions, also the inventive curing agents in the form of water-in-oil microemulsions, can be converted to oil-in-water microemulsions, for example by adding water. During said conversion of the microemulsion, they pass through a viscoelastic gel-state which is caused through the presence of a liquid-crystalline phase (viscosity peak). In the simplest case in this state, the surfactant molecules are present as laminar or cylindrical micelles which are oil-swollen and water-swollen, and which have macroscopic dimensions. Such a medium is anisotropic and has the ability to polarize light and it shows the phenomenon of the double refraction.

Systems which form macroemulsions require the input of work for an emulsification if they are diluted. Contrary to this, the inventive curing agents which are microemulsions, do not require such a work when they are diluted. In the dilution range of the microemulsions, the curing agents are translucent, i.e. depending from the thickness of the layer, they are clear to opaque, and they are not doubly refracting.

They are furthermore resistant to the high shear speeds which are to be encountered in a dissolver, and they are furthermore resistant to the enormous accelerations of a laboratory centrifuge. Also very diluted corresponding curing agents do not cream up because the Brown's movement is sufficient in order to maintain the micro-droplets in a homogenous distribution.

Microemulsions are thermodynamically stable, and therefore they do not change their properties during long periods of time or even never, if they are maintained under about constant conditions. It, however, is possible that inventive curing agents are coalescing if they are heated to high temperatures. When the corresponding products are however thereafter cooled to lower temperatures, they again form microemulsions without being stirred.

In the publication "Microemulsions" of L. M. Price, published by Academic Press New York 1977, there is outlined the historical development of microemulsions. Furthermore, a reference to pertinent publications is also to be found in the handbook "Tensid-Taschenbuch", of H. Stache, K. Kosswig, third edition, published by Carl Hanser-Verlag in Munich, 1990, first chapter. The scientist Pierre-Gilles de Gennes, to whom the Nobel price had been granted in the year 1991, made essential investigations in the field of the development of the theoretical background of the arrangements in liquid crystalline phases, microemulsions and other colloidal systems.

Nowadays there exist well-founded theories concerning the essential features and properties of microemulsions. Nevertheless, however, it sometimes is rather difficult to produce certain products as microemulsions. The particle sizes in microemulsions are only one tenth to one hundredth of the particle size of microemulsions as already mentioned before. This means that the surface of the particles of the microemulsions is a hundred times to tenthousand times larger than the surface of the particles of macroemulsions. Therefore, it is not surprising that for the preparation of macroemulsions usually 1-2% by weight of an emulsifier, referred to the total weight of the macroemulsion, is sufficient while for the preparation of microemulsions up to 50% by weight, referred to the total weight of the microemulsion of a mixture of an emulsifier and a coemulsifier has to be incorporated. Such high quantities of surfactants, however, are only acceptable if the corresponding surfactants are a component of the "active ingredient". Therefore, it is not possible to prepare microemulsions by using the usual emulsifiers which are available in the market.

According to one embodiment of the present invention, the inventive curing agents comprise an emulsifier and a coemulsifier, as well as a water insoluble bis(-diamine)-diepoxide adduct, which are prepared from starting materials which are available in the market, according to the following scheme:

Scheme 1

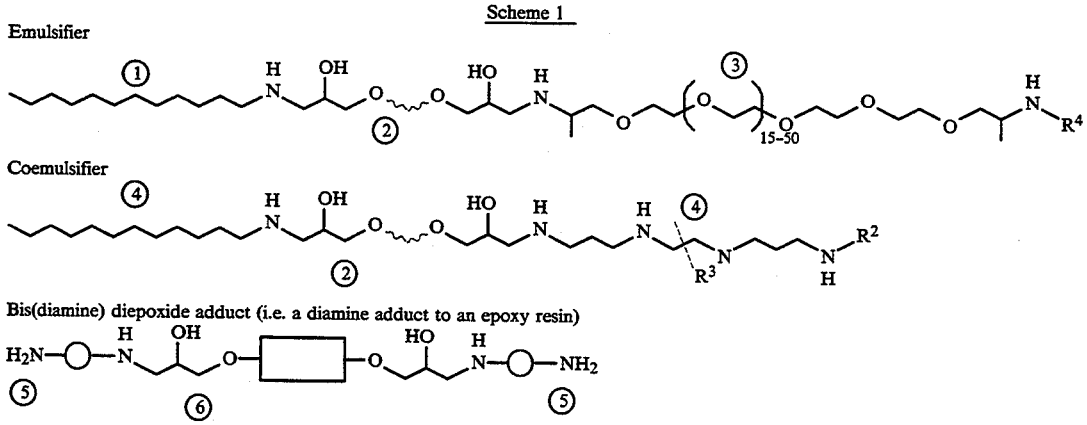

In the above scheme 1 the symbols have the following meanings:

$R^1$ and $R^2$ are hydrogen, alkyl or aryl substituted alkyl, and specific examples are methyl, ethyl, n-propyl, isopropyl, butyl and benzyl.

① = alkylamine, for example a fatty amine
② = aliphatic diglycidyl ether
③ = polyether-diamine, like for instance Jeffamine ED 900, 2001 and further diamines.
④ = polyalkylene polyamine, like e.g. triethylene tetramine (TETA), tetraethylene pentamine (TEPA), N,N'-bis-(2-aminopropyl)-ethylene diamine [$N_4$-amine], and so on.
⑤ = cycloaliphatic diamine, like e.g. 3-aminomethyl-3,5,5-trimethyl cyclohexylamine (IPD), m-xylylene diamine (mXDA) and so on.
⑥ = mixtures of aliphatic and aromatic diglycidyl ethers.

It is well known for a person experienced in the field of tensides that the blocking of the terminal group results in emulsifiers which are not foaming too much. With regard to this, we refer for instance to the publication of A. Pryce et al. which is entitled "End blocked non-ionic surfactants—a new approach", see the report about the congress concerning surfactants (Welt-Tensid-Kongress), Munich 1984, page 51.

The terminal alkylation of the emulsifiers and the coemulsifiers which are a component of the inventive curing agents, however, does not only reduce their tendency to form foams, but said modification of the terminal group results in the further advantages of said products as compared with corresponding tensides which are not alkylated:

an improvement of the gloss of the formed films
a highly improved adherence of the films
a better compatibility of the curing agent with such additives which are usually present in mortar compositions
a better workability of the ECC products which are produced using said curing agents.

Said alkylation can be performed according to such methods which are usual in the performance of N-alkylations. It, however, was found out that alkylating agents, like dimethylsulfate, diethylsulfate and similar N-alkylating compounds, should not be used for performing said reaction, because the corresponding alkylating agents are highly toxic, and through said alkylation there are introduced undesired ions, like $SO_4^{2-}$, $Cl^-$, $Br^-$ and other ions which deteriorate the mortar, and which have corrosive properties, specially in as far as reinforcing materials, like iron bars, are concerned. It is therefore preferred to produce the emulsifiers and coemulsifiers which are components of the inventive curing agents by performing a reducing alkylation using an aldehyde and formic acid.

The corresponding alkylation reactions are well known in the art and designated as Leuckart-Wallach-reaction or as Eschweiler-Clarke-reaction. With regard to this, we refer to the book Houben-Weyl XI/1, page 648, as well as to "Ullmanns Encyklopädie der technischen Chemie" (encyclopedia of the technical chemistry of Ullmann), volume XIV, page 639. Said reactions are also named "reductive amination of imines", because if as aldehyde there is for instance used formaldehyde, there is produced as intermediate product the imine which is then reduced through a hydride ion which is formed from the anion of the formic acid.

The corresponding reduction, however, can be also performed through a catalytic hydrogenation. A further possibility of performing the alkylation is to use such alkylating agents which are less toxic than dimethylsulfate and the other alkylating agents mentioned before, and as examples for such alkylating agents which are less harmful, there are mentioned trimethylphosphate or dimethyl-methylphosponate. The ions which are introduced through the corresponding alkylating agents, furthermore, do not corrode any reinforcing materials which are optionally present in the concrete products, like reinforcing bars of steel or iron.

It, however, is possible that specific ECC products have less desired properties in the course of their application, due to the presence of such alkylating materials. Furthermore, the results are usually less desirable if a 2-hydroxy-alkylation with low molecular epoxides is performed.

When the emulsifiers and coemulsifiers are prepared which are to be used as component of the inventive curing agents, then attention has to be paid that said emulsifiers and coemulsifiers are produced in high yields so that in the corresponding curing agents the necessary concentrations of said products are present. Surprisingly high yields are actually achieved in spite of the fact that the reactions are performed using mainly such molecules which are bifunctional. With regard to this, we refer to the reactions which are described in example 1.

In as far as the preparation of the emulsifier is concerned the good yields probably are due to the following considerations. The smaller and sterically less hindered alkyl amines will react faster with the aliphatic epoxy resin, which is added quickly to the reaction mixture, than the far larger polyether diamines. It is furthermore likely that the molecules of the alkylamine as well as the molecules of the monoadduct of alkylamine to the epoxy resin, which monoadduct is formed as intermediate product, are arranged to form micelles and vesicles because of the chemical structure, in spite of the fact that the reaction mixture does not yet contain water. It is obvious that the alkyl residues of said molecules have the tendency to associate to other alkyl radicals and not to the polyether segments of the polyether diamine. It is furthermore well known to a person experienced in the art that the diffusion of starting materials, of intermediate products and of final products is often drastically changed, respectively diminished in systems in which properties which resemble to those of membranes are encountered, and which systems are also named membrane-mimetic-systems. Said properties can result in matrix-effects or in a fast separation of products and thereby undesired secondary reactions can be hindered or even avoided.

The above mentioned properties of said system seem to explain why the long polyether diamine molecules to a large extent only react with one of their two terminal amino groups with the alkylamine epoxy resin monoadduct to that the desired emulsifier is formed in sufficiently high yields. With regard to this, reference is made to the publication of J. H. Fendler, in "Membrane Mimetic Chemistry", John Wiley & Sons, New York 1982.

The curing agent which was produced according to the process described in example 1 had the aimed advantages over curing agents according to the prior art. Said inventive curing agent comprises three different bis-adducts, i.e. the emulsifier, the coemulsifier as well as the bis(diamine)diepoxide adduct, and therefore its viscosity at a temperature of 20° C. is very high. Said emulsifier is not well suited for the intended purposes as water-in-oil microemulsion which has a high solids content, like 80% by weight, referred to the total weight of said water-in-oil microemulsion. Therefore, the corresponding curing agent usually is diluted with water immediately after its preparation until its solids content is only 50% by weight.

The corresponding curing agents have a very low content of free diamines and theoretically the corresponding curing agent does not at all contain free not chemically bonded diamines, and said curing agent furthermore has an excellent emulsifiability. The smell of said curing agent and its properties when used, therefore resemble more closely to the corresponding properties of a detergent composition having basic properties than to a corresponding amine-curing agent. Further advantages of the inventive curing agents reside in the good properties of coatings and paints which are made using them, and in the surprisingly fast complete curing of the applied layers or films.

However, if in the scheme 1 outlined before, the aliphatic diglycidylethers, i.e. components 2, are substituted by the far cheaper epoxy resins which are available in the market, like e.g. bisphenol-A-diglycidylether, which in the future will be also abbreviated as BPADGE, then several properties of the curing agents are usually deteriorated. The main difficulties which are to be found with such curing agents which were prepared with the cheaper starting material, are the following:

Frequently the corresponding products lose their ability of forming microemulsions. It is believed that this is true because the molecules of the emulsifier have in their structure rigid parts which were introduced through the epoxy resin and therefore said molecules obviously are no longer able to bend to such a high extent at the intermediate surfaces between the water phase and the oil phase to form microemulsions.

The problems which are caused through a high viscosity are very severe and sometimes make the product useless.

The films which are formed when said curing agents are used to cure corresponding epoxy resin compositions are unsatisfactory, because of not good film forming properties due to the inclusion of water.

It is possible to avoid the above stated difficulties by adding at the end of the process of the preparation of said curing agents one mol of diamine per mol of bisadduct which is present in said curing agent. Said added diamine results in that the corresponding curing agents can be diluted with water to a product having a solid content of 80%, referred to the curing agent. If said curing agents are further diluted with water, then they form the desired oil-in-water microemulsions which have the desired advantages of such systems.

The added diamines are water soluble, however, nevertheless it seems to be possible that they form a kind of an inclusion complex with the two hydroxy groups of the bis(diamine)-diepoxide adduct due to so called hydrophobic interactions. With regard to said explanation, we refer to the book named "Emulgatoren für die Lebensmittelchemie" ("emulsifiers for the food chemistry") of G. Schuster, published by Springer, Berlin 1985), page 40, as well as to the publication of F Diederich, "Chemie in unserer Zeit" ("Chemistry in our times"), 4, 105 (1983). Because of that the strong intermolecular hydrogen bonds between the molecules of the emulsifier are removed, and the mobility of the molecules of the emulsifier as well as its ability to spread out is increased.

Therefore the inventive curing agents can be also prepared according to the idealized scheme 2 which is illustrated below:

Scheme 2

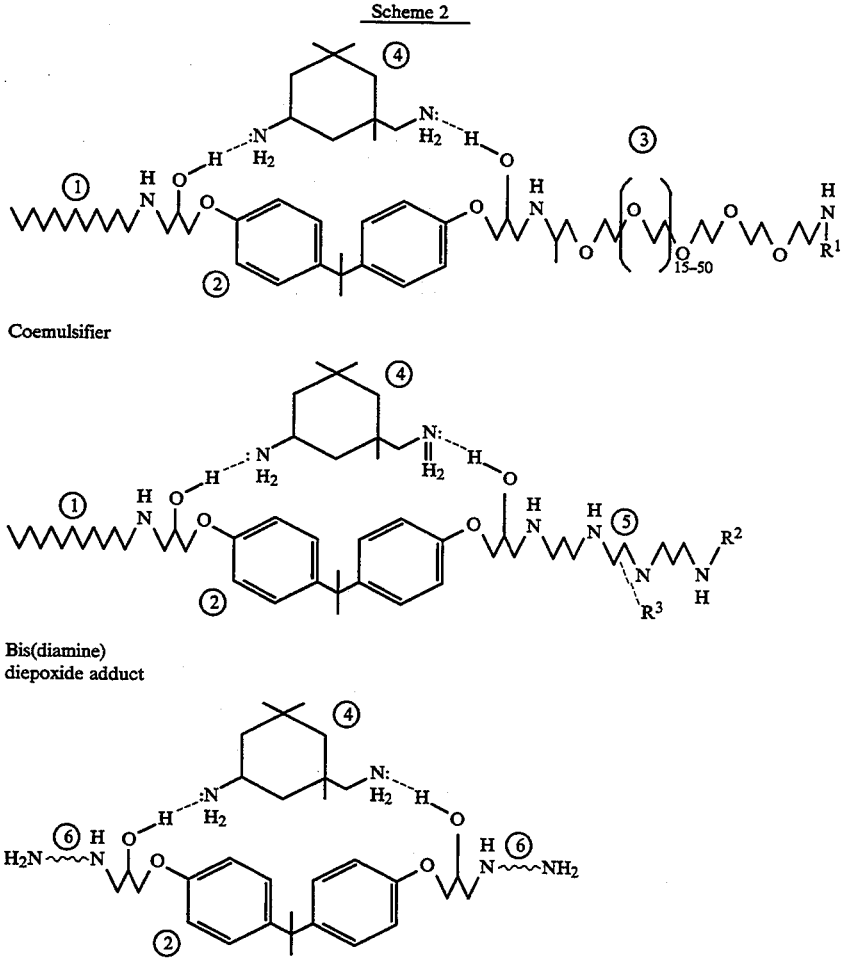

Coemulsifier

Bis(diamine) diepoxide adduct

In the above scheme II the symbols have the following meanings:

R¹ and R² are hydrogen, alkyl or aryl substituted alkyl, and specific examples are methyl, ethyl, n-propyl, isopropyl, butyl and benzyl.

1 = alkylamine, for example a fatty amine
2 = bisphenol-A-diglycidyl ether, which is in the future also abbreviated as (BPADGE).
3 = polyether-diamine, like for instance Jeffamine ED 900, 2001, and further diamines.
4 = diamine, for example 3-aminomethyl-3,5,5,-trimethyl cyclohexylamine (IPD), m-xylidene diamine (mXDA), Jeffamine D-230 and so on.
5 = polyalkylene polyamine, like e.g. triethylene tetramine (TETA), tetraethylene pentamine (TEPA) NH-bis-(2-amino propyl)-ethylene diamine [N4-amine, and so on.
6 = diamine, for example 2-methyl-penta methylenediamine (MPMD), trimethylhexylmethylenediamine (TMD), Jeffamine D-230, 3-aminomethyl-3,5,5,-trimethyl cyclohexylamine (IPD), m-xylidene diamine (mXDA) and so on.

The present invention will be further illustrated through the following non-limitative examples:

The starting materials which are used in the examples 1 to 5, as well as products which are available in the market under trademarks, are further explained in the following table. The corresponding explanations furthermore also concern products available under trademarks which are used as components for preparing the emulsifiers, coemulsifiers, respectively bis(diamine)-diepoxide adducts which are illustrated through the scheme 1 and the scheme 2 stated before.

In the following table, the abbreviation "PEG" means polyethylene glycol, and the abbreviation "PPG" means polypropylene glycol.

In the first column of said table there are stated the starting materials which are used for the preparation of the products which are sold with the trademarks, which are indicated in the second column of said table, and in the third column the producer of the corresponding products is indicated. In the last column of the following table there are stated the numbers of Chemical Abstracts (indicated as CAS-Nr) under which more detailed information concerning the indicated products can be found.

TABLE

| Starting material | Trademark | Producer | Mr [g/mol] aprox. | EM [g/eg] aprox. | CAS-Nr. |
|---|---|---|---|---|---|
| α,ω-Bis(aminopropyl)-PEG | Jeffamine ED 2001 | TEXACO | 2000 | 500 | 65605-36-9 |

TABLE-continued

| Starting material | Trademark | Producer | Mr ([g/mol] aprox. | EM [g/eg] aprox. | CAS-Nr. |
|---|---|---|---|---|---|
| α,ω-Bis(aminopropyl)-PPG | Jeffamine D-230 | TEXACO | 240 | 60 | 9046-10-0 |
| Cocoamine, dest. | Armeen CD | Akzo | 200 | 100 | 61788-46-3 |
| Cocoamine, dest. | Genamin CC-100D | HOECHST | 200 | 100 | 61788-46-3 |
| N,N'-Bis-(2-aminopropyl)-ethylene-diamine | N₄-Amine | BASF | 174 | 29 | 10563-26-5 |
| 3-Aminomethyl-3,5,5-trimethylcyclohexyl-amine | Vestamin-IPD | HUELS | 170 | 42,5 | 2855-13-2 |
| m-Xylylene-diamine | mXDA | Mitsubishi Gas | 136 | 34 | 1477-55-0 |
| Propyleneglycol-diglycidylether | DER 736 | DOW | 374 | 187 | 8072-62-2 |
| Bisphenol-A-diglycid-ether | Araldit GY250 | CIBA-GEIGY | 376 | 188 | 25085-99-8 |
| Bisphenol-A/F-diglycidylether | Eurepox 720 | Schering | 374 | 187 | |
| Cresyl-glycidyl-ether | RV 1805 | EMS | 180 | 180 | 26447-14-3 |
| Benzaldehyde | | Bayer | 106 | | 100-52-7 |
| Formaldehyde 37% | | Degussa | 30 | | 50-00-0 |
| Formic acid | | Degussa | 46 | | 64-18-6 |
| Nonyl-phenoxy-poly-ethoxy-ethanol | Antarox CO 880 | GAF | 1540 | | 9016-45-9 |

EXAMPLE 1

160.00 g (about 80 mmols) of Jeffamine ED 2001 (TEXACO) are molten in a closed apparatus which is equipped with a dropping funnel and a stirrer. Then the molten amine is heated to 80° C. and thereafter 8.48 g (80 mmols) of benzaldehyde are added drop by drop within a period of 5-10 minutes, and during the addition the mixture is stirred vigorously.

The stirring is continued for further 10 minutes, and thereafter there are added rapidly 15.92 g (about 80 mmols) of Armeen CD (Akzo) and then there are added 30 g (about 80 mmols) of the epoxy resin DER 736 (DOW). The stirring is continued for further 60 minutes and the temperature maintained at 80° C. and then there are added rapidly 41.76 g (240 mmols) of N₄-Amin (BASF), and the mixture is cooled, preferably to a temperature of about 50° C. Thereafter, there are added slowly drop by drop, while continuing the cooling, 19.46 g (240 mmols) of an aqueous solution of formaldehyde (37% formaldehyde), and during the addition the mixtures is stirred vigorously. After further ten minutes, there are added 47.76 g (240 mmols) of Armeen CD, and at a temperature of 70° C. there are dropped into the mixture continously and as quickly as possible, 90 g (about 240 mmols) of DER 736. At the moment, the reaction starts, the mixture must be first cooled and then heated again.

Then the mixture is maintained for further 60 minutes at a temperature of 80° C., and then there are added 150.78 g (887 mmols) of IPD (HUELS), and 120.62 g (887 mmols) of m-xylylendiamine (Mitsubishi Gas). During said addition, the temperature decreases to about 65° C. Then there are dropped into the mixture 166.30 g (about 443 mmols) of DER 736, and 166.30 g of Araldit GY 250 (CIBA-GEIGY). During the addition of the two last mentioned components, the mixture has to be cooled. The reaction is latent to a certain extent. Thereafter, the mixture is heated carefully to 80° C. and the stirring continued at said temperature for further 60 minutes.

Then there are added 19,00 g (351 mmols) of an aqueous formic acid (85% formic acid) within 15 min. and the stirring is continued for further 105 min. while maintaining the mixture at 80° C. Finally the mixture is diluted with 979.4 g of tap-water. This results together with the water which was formed during the reaction and minus the carbon dioxide which had evolved during the reaction in 2 kg of the curing agent 1, and said curing agent has a solids content of 50%.

Caution: When during the above mentioned procedure fatty amines are used, the eyes of the operator should be protected by protecting goggles in order to prevent any harm through splashes of fatty amines.

EXAMPLE 2

160.00 g (about 80 mmols) of Jeffamine ED 2001 (TEXACO) are molten in a closed apparatus which is equipped with a dropping funnel and a stirrer, and then there are added 15.92 g (about 80 mmols) of Genamine CC-100 D (HOECHST), and the mixture is heated to a temperature of 80° C. Then there are added quickly 30 g (about 80 mmols) of Araldit GY 250 (CIBA-GEIGY), and the stirring is continued for further 120 min. at a temperature of 80° C. and thereafter 8.48 g (80 mmols) of benzaldehyde are dropped into the mixture within a period of 5 to 10 min., and thereafter the mixture is stirred for further 10 min.

Then there are added quickly 41.76 g (240 mmols) of N₄-Amine (BASF), and then the mixture is cooled, preferably to a temperature of about 50° C. Thereafter, the mixture is stirred vigorously, and there are added slowly drop by drop while maintaining the cooling, 19.46 g (240 mmols) of an aqueous solution of formaldehyde (37% formaldehyde), and after all the formaldehyde is added, the mixture is stirred for further 10 min. and then there are added 47.76 g (240 mmol) of Genamine CC-100 D (HOECHST). The mixture is maintained at a temperature of about 70° C., and into the mixture there are dropped in continuously and as quickly as possible, 90 g (about 240 mmols) of Araldit GY 250. As soon as the reaction starts, the mixture has first to be cooled and then heated once again. The stirring is continued for 60 min. at a temperature of 80° C., and then there are added within a period of 15 min. 19.00 g (351 mmols) of an aqueous solution of formic acid (85 % formic acid), and the stirring is continued for further 105 min. while maintaining the temperature at 80° C. Then there are added to the mixture 257.40 g (about 1072 mmols) of Jeffamine D 230 (TEXACO), and thereafter slowly drop by drop 201.10 g (536 mmols) of Araldit GY 250. During the adding of said components, the cooling has to be continued. The reaction is latent to a certain extent. Thereafter, the mixture is heated carefully to a temperature of 80° C. and then stirred for further 60 min.

Then there are added first 145.60 g (865 mmols) of Vestamine-IPD (HUELS) and then 229.4 g of tap water. Together with the water which had been formed during the reactions, and minus the carbon dioxide which had evolved during the reaction, this yields 1.25 kg of the curing agent 2 which has a solids content of 80%.

EXAMPLE 3

The procedure described in example 2 is repeated, however at the end of the synthesis, there are added 116.40 g (856 mmols) of m-xylylenediamine instead of the IPD which had been added in example 2. Then the curing agent 3 is diluted with water until a solids content of 80%, referred to the weight of the curing agent, is reached.

EXAMPLE 4

The synthesis is performed in the same way as outlined in example 2, however at the end of the synthesis there are added 205.40 g (about 856 mmols) of Jeffamine D-230 (TEXACO), instead of the IPD which had been added according to example 2. Finally, also said curing agent 4 is diluted with water until a solids content of 80%, referred to the weight of the curing agent 4, is reached.

EXAMPLE 5

In the present example of the properties of the curing agents 1 through 4, which had been prepared according to the preceding examples 1 through 4, are tested. The epoxy resin dispersion was prepared according to the following procedure:

55.2 g of a bisphenol-A/F-epoxy resin, e.g. Eurepox 720 (Schering), 3.6 g of a cresyl-glycidyl-ether, e.g. the product RV 1805 (EMS) and 1.2 g of a non-ionic emulsifier, were emulsified in 40 g tap water according to the usual procedures, to yield an epoxy resin dispersion which had a solid content of 60% by weight, referred to the weight of said dispersion, and said epoxy resin dispersion is named component A in the following passages. The non-ionic emulsifier which was used for preparing said component A, was a nonyl-phenoxy-polyethoxy-ethanol which comprised about 30 mols of ethylene oxide units per molecule (HLB=17), e.g. the product "Antarox CO 880" (GAF). The corresponding epoxy resin dispersion had an epoxide-equivalent weight, expressed in g/eq, and abbreviated as EEM of 179 g/eq (referred to 100% of the epoxy resin).

All the tested curing agents were diluted before their use with water to a solid content of 50% solids referred to the total weight of said curing agents. Said aqueous curing agents are designated as components B in the following passages. For the curing agents the H-active-equivalent weight or the NH-equivalent weight was calculated, and said NH-EM expressed in g/eq. The corresponding calculations are based on the stochiometric formulas of the corresponding curing agents.

The component A was mixed with the component B, using a mixer which is equipped with a propeller, and the mixing of said components was performed at a propeller speed of about 200 rpm for about 30 seconds. Immediately thereafter, the mixture was applied with an applicator having a gap width of 76 $\mu$m and 500 $\mu$m respectively onto a glass surface, and the layer cured at the environmental conditions of the laboratory.

The time until a gel is formed was determined with a Beck-Koller 3-speed Drying Recorder (The Mickle Laboratory Engineering Co., Mill Works, Gomshall Guildford, Surrey GU5 9LJ, England),and the corresponding values recorded and stated in the following table:

The viscosities were determined with a cone and plate viscosimeter, i.e. the apparatus Rheomat 115, CP8, resp. CP5, which is available from Mettler, Greifenseestr. 25, CH-8604 Volketswil, Switzerland. The corresponding determinations were performed at the stage 5 of said viscosimeter.

The hardness according to Buchholz was tested with a PIG-apparatus which is available from Byk-Labotron AG, Lausitzerstrasse 8, D-8192 Geretsried 2, Germany.

The water-number was expressed in ml and determined according to the method described by H. L. Greenwald et al., Anal.Chem. 28, 1693 (956).

| Curing agent | 1 | 2 | 3 | 4 |
| --- | --- | --- | --- | --- |
| Concentration [%] | 50 | 80 | 80 | 80 |
| Appearance | translucent | clear | clear | clear |
| NH-EM (100%) [g/eq] | 148 | 124 | 120 | 131 |
| Amine value [mg KOH/g] | 110–113 | 210–222 | 205–215 | 220–235 |
| Water-number [ml], corrected | 17.4 | 13.1 | | |
| Viscosity [mPas], at about 20° C. | 33 000 | 54 000 | 108 000 | 47 000 |
| Shelf life if stored at 50° C. for 2 weeks | | | | |
| not diluted | gel formation | o.k. | o.k. | o.k. |
| diluted to a solid content of 20% | o.k. | o.k. | o.k. | o.k. |
| Mixture of A + B (Epoxy resin emulsion + curing agent) Viscosity [mPas], 20° C. after about 10 min. | 1 200 | 1 300 | 710 | 250 |
| Properties of the film | | | | |
| 1. applied in a thickness of 76 $\mu$m Appearance | o.k. | o.k. | o.k. | o.k. |
| Beck-Koller, time stated in hours after which the following state is reached | | | | |
| soft gel | <0.5 | 3.7 | 5.0 | 7.0 |
| hard gel | 4.2 | 7.1 | 10.5 | 14.0 |
| scratch trace | 10.2 | >15.0 | 21.0 | >22.0 |
| 2. applied in a thickness of 500 $\mu$m | o.k. air | o.k. | o.k. | o.k. |

| Curing agent | 1 | 2 | 3 | 4 |
|---|---|---|---|---|
| Appearance | bubbles | | bluish | |
| Buchholz hardness determined | | | | |
| after 3 days | 71 | 83 | 77 | 63 |
| after 10 days | 100 | 100 | 100 | 95 |
| Adherence onto glass after 3 days | o.k. | o.k. | o.k. | o.k. |

EXAMPLE 6

An EEC mortar was prepared using the epoxy resin emulsion according to example 5 and the suitably diluted curing agent 2, as well as cement and sand. The EEC mortar was prepared by using the stated components in the stated amounts, and the mixing procedure was performed for three minutes in a power mixer (COLLOMIX GmbH, Horchstr. 2, D-8074 Gaimersheim, Germany). Thereafter, from the mixture the mortar prisms 40×40×160 mm (according to DIN 1164, part 7) were prepared and tested after 28 days of storage at 23° C. and 50% relative humidity of the surrounding air.

| EEC mortar component | weight % |
|---|---|
| emulsifiable epoxy resin (see example 5, 100%) | 3.01 |
| curing agent (100%) | 1.09 |
| Portland cement | 22.47 |
| sand | 60.76 |
| tap water | 11.67 |
| | 100.00 |
| resin/cement ratio = 0.23 (calculated as weight of resin curing agent per dry weight of cement) | |
| water/cement ratio = 0.52 | |
| compressive strength | 51 N/mm$^2$ |
| flexural strength | 10.5 N/mm$^2$ |
| pull off strength | 3.7 N/mm$^2$ (cohesive concrete failure) |
| high stability when submitted to freezing and thawing according to the standard test SN 640 461 (Schweizerische Normenvereinigung). | |
| diffusion coefficient | $\mu CO_2$ 100 000 $\mu H_2O$ approx. 300 |
| water absorption coefficient A = 0,03 kg/m$^2$ h according to DIN 52617. | |

Furthermore, the resistance of the test specimens to saponification was tested. According to said tests the shaped bodies were stored for 28 days in an aqueous solution which was saturated with Ca(OH)$_2$ at a temperature of 60° C.

After said storage period the compressive strength remained unaltered if compared with the compressing strength of the corresponding shaped bodies which were not submitted to such a treatment in the calcium hydroxide containing solution.

The bending strength, however, was lowered by 16%, if the bending strength of the shaped bodies which were not submitted to said treatment is set to be 100%.

The pull off strength, however, was increased by 10% (cohesive concrete failure).

I claim:

1. A curing agent for aqueous epoxy resin dispersions comprising:
   (i) about 10 to 80% by weight of at least one emulsifier which includes at least one polyalkylene-polyether-diamine-group represented by the following formula:

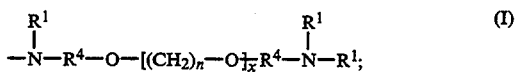

wherein the R$^1$ groups may be the same or different and each is selected from hydrogen, straight or branched chain alkyl residues having 1-6 carbon atoms, or straight or branched chain alkyl radicals having 1-6 carbon atoms substituted with one or more phenyl residues, the R$^4$ groups may be the same or different, and each is selected from alkylene groups having 1 to 8 carbon atoms, n is an integer of 1 to 5, and x is an integer of from 8-90, (ii) about 1-80% by weight of a coemulsifier comprising at least one polyalkylene polyamine group of the following formula:

wherein the R$^1$ group and n are as defined above, and y is an integer of from 1-6, and (iii) about 5-80% by weight of at least one bis(-diamine)-diepoxide-adduct comprising at least two amino-alcohol groups of the following formula:

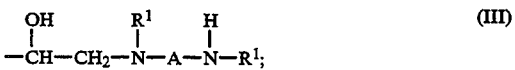

wherein the R$^1$ groups are as defined above, and A is an alkylene residue, cycloalkylene residue, a polyalkylene-polyether-residue, or a bivalent residue comprising alkyl groups and cycloalkyl and/or aromatic groups.

2. A curing agent according to claim 1, wherein said emulsifier (i) comprises, per molecule thereof, one polyalkylene-polyether-diamine-group of formula (I), said coemulsifier (ii) comprises, per molecule thereof, one polyalkylene-polyamine-group of formula (II), and wherein the remaining parts of the molecule of the emulsifier and coemulsifier, have structures which are identical.

3. A curing agent according to claim 1, wherein the group of formula (I) of emulsifier (i) is bonded to a structure of the following formula:

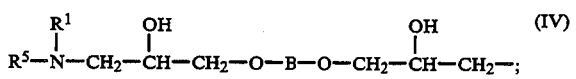

wherein R$^5$ is a long chain alkyl residue having 7-25 carbon atoms, or an aliphatic polyamine residue of the following formula:

$$R^6-Y+NH-CH_2-CH_2)_z-,$$

wherein $R^6$ is an alkyl residue having 7–25 carbon atoms, Y is a direct linkage or a bivalent group of formula:

$$\overset{O}{\underset{\|}{-C-}},$$

and z is an integer of 1 to 4; B is an alkylene residue, an alkylene residue interrupted in its alkylene chain through one or more ether oxygen atoms, or a bivalent cycloaliphatic, aromatic or araliphatic residue; and $R^1$ is selected from the group of hydrogen, straight or branched chain alkyl residues having 1–6 carbon atoms, or straight or branched chain alkyl residues having 1–6 carbon atoms and which are phenyl substituted.

4. A curing agent according to claim 1, wherein co-emulsifier (ii) the polyalkylene-polyamine-group of formula (II) is bonded to a structure of the following formula:

$$R^5-\underset{\underset{R^1}{|}}{N}-CH_2-\underset{\underset{OH}{|}}{CH}-CH_2-O-B-O-CH_2-\underset{\underset{OH}{|}}{CH}-CH_2-; \quad (IV)$$

wherein $R^5$ is a long chain alkyl residue having 7–25 carbon atoms or an aliphatic polyamine residue of the following formula:

$$R^6-Y+NH-CH_2-CH_2)_z-,$$

wherein $R^6$ is an alkyl residue having 7–25 carbon atoms, Y is a direct linkage or a bivalent group of formula:

$$\overset{O}{\underset{\|}{-C-}},$$

and z is an integer of 1 to 4; B is an alkylene residue or an alkylene residue interrupted through one or more ether oxygen atoms, or a bivalent cycloaliphatic, aromatic or araliphatic residue; and $R^1$ is selected from the group of hydrogen, straight chain or branched alkyl residues having 1–6 carbon atoms, and phenyl substituted alkyl radicals comprising 1–6 carbon atoms in the alkyl moieties.

5. A curing agent according to claim 1, wherein the bis(diamine)-diepoxide adduct (iii) the two groups of formula (III) are bonded to a bivalent structure of the following formula:

$$-CH_2-O-B-O-CH_2- \quad (V);$$

wherein B is an alkylene residue or an alkylene residue, the carbon chains of which are interrupted through one or more ether oxygen atoms, or a bivalent cycloaliphatic, aromatic or araliphatic residue, and wherein the two groups of formula (III) bonded to said bivalent structure of formula (V), have the same structure, or a different structure.

6. A curing agent according to claim 1, further comprising a diamine or a mixture of two or more diamines, wherein said curing agent has the following composition:

10–80% by weight of emulsifier (i),
1–80% by weight of co-emulsifier (ii),
5–80% by weight of bis(diamine)-diepoxide-adduct (iii), and
1–80% by weight of the diamine or mixture of two or more diamines.

7. A curing agent according to claim 6, wherein the diamine is a diamine comprising two primary amino groups which corresponds to the following formula:

$$H_2N-B-NH_2 \quad (VI);$$

wherein B is an alkylene residue or an alkylene residue the carbon chain of which is interrupted through one or more ether oxygen atoms, a bivalent cycloaliphatic or aromatic group, or a bivalent residue which comprises alkyl, and cycloalkyl and/or aromatic groups.

8. A curing agent according to claim 1, further comprising water present in the form of a non-ionic microemulsion.

9. A curing agent according to claim 8, said water being present as an oil in water microemulsion.

10. A process for the preparation of a curing agent according to claim 1, comprising mixing components (i), (ii) and (iii) with each other.

11. A process according to claim 10, further comprising the addition of 1–80% by weight of a diamine or mixture of two or more diamines.

12. A process according to claim 10, further comprising the addition of water to produce the curing agent in the form of a microemulsion.

13. A process according to claim 10, wherein emulsifier (i) is prepared wherein polyalkylene-polyether-diamine-group of formula (I) is bonded to a structure which corresponds to the following formula:

$$R^5-\underset{\underset{R^1}{|}}{N}-CH_2-\underset{\underset{OH}{|}}{CH}-CH_2-O-B-O-CH_2-\underset{\underset{OH}{|}}{CH}-CH_2-; \quad (IV)$$

$R^1$ is defined as in claim 1; $R^5$ is a long-chain alkyl residue having 7 to 25 carbon atoms, or an aliphatic polyamine residue which corresponds to the following formula, $$R^6-Y+NH-CH_2-CH_2)_z-,$$

wherein $R^6$ is an alkyl residue having 7–25 carbon atoms, Y is a direct linkage or a bivalent group of formula, $$\overset{O}{\underset{\|}{-C-}},$$

and z is an integer of 1 to 4; and B is an alkylene residue or an alkylene residue where the carbon chain is interrupted through one or more ether oxygen atoms, or a bivalent cycloaliphatic, aromatic or araliphatic residue; said preparation comprising reacting an alkyl monoamine and/or an alkylpolyamine which corresponds to the following formula:

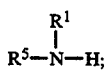 (VII)

with a diepoxide which corresponds to the following of the formula:

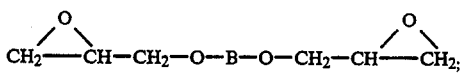 (VIII)

as well as with a polyalkylenepolyetherdiamine which corresponds to the following formula:

 (IX)

14. A process according to claim 10, wherein said coemulsifier (ii) is prepared wherein the polyalkylenepolyamine group of formula (II) is bonded to a structure which corresponds to the following formula:

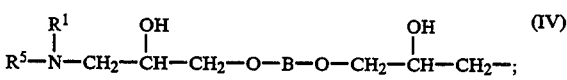 (IV)

wherein $R^1$ has the same meaning as defined in claim 1; $R^5$ is a long-chain alkyl residue comprising 7 to 25 carbon atoms, or an aliphatic polyamine residue which corresponds to the following formula,

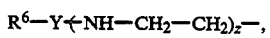

wherein $R^6$ is an alkyl residue having 7 to 25 carbon atoms, Y is a direct linkage or a bivalent group of formula

and z is an integer of 1 to 4; and B is an alkylene residue or an alkylene residue the carbon chain of which is interrupted through one or more ether oxygen atoms, or a bivalent cycloaliphatic, aromatic or araliphatic residue; said preparation comprising reacting an alkylmonoamine or an alkylpolyamine which corresponds to the following formula:

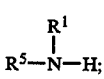 (VII)

with a diepoxy compound of the formula:

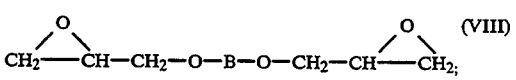 (VIII)

as well as with a polyalkylenepolyamine which corresponds to the following formula:

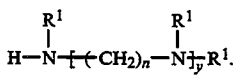 (X)

15. A process according to claim 10, wherein said bis(diamine)-diepoxide adduct (iii) is prepared, wherein the two amino-alcohol groups which correspond to formula (III) are bonded to a bivalent structure which corresponds to the following formula:

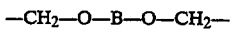 (V);

wherein B is an alkylene residue or an alkylene residue the carbon chain of which is interrupted through one or more ether oxygen atoms, or a bivalent cycloaliphatic, aromatic or araliphatic residue, and wherein the two groups of formula (III) which are bonded to said bivalent structure of formula (V) are the same or different, said preparation comprising reacting one or more diamines which correspond to the following formula:

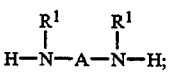 (XI)

with a diepoxide which corresponds to the following formula:

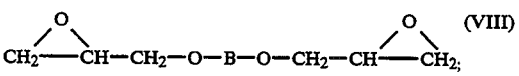 (VIII)

16. A process according to claim 10, wherein the curing agent is prepared using a one pot process.

17. A process according to claim 10, wherein at least one diamine substituent or polyamine substituent of emulsifier (i) or coemulsifier (ii) is represented by the following formulae:

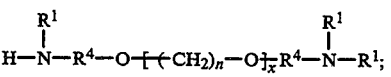 (IX)

or

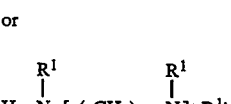 (X)

and is prepared, in situ, by a reducing alkylation of amines through reaction with aldehydes and formic acid.

18. A process according to claim 10, wherein different adducts are prepared separately, or in a one pot procedure one after the other, and wherein each preparation is performed at a temperature of 50° to 90° C.

19. A curing agent for aqueous epoxy resin dispersions comprising:
(i) about 10 to 80% by weight of at least one emulsifier which includes at least one polyalkylenepolyether-diamine-group represented by the following formula:

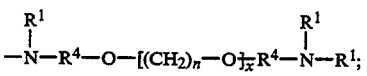 (I)

wherein the $R^1$ groups may be the same or different and each is selected from hydrogen, straight or branched chain alkyl residues having 1–6 carbon atoms, or straight or branched chain alkyl radicals having 1–6 carbon atoms substituted with one or more phenyl residues, the $R^4$ groups may be the same or different, and each is selected from alkylene groups having 1 to 8 carbon atoms, n is an integer of 1 to 5, and x is an integer of from 8–90, and wherein the group of formula (I) of emulsifier (i) is bonded to a structure of the following formula:

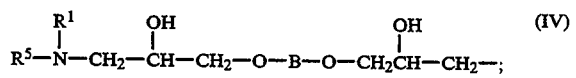  (IV)

wherein $R^5$ is a long chain alkyl residue having 7–25 carbon atoms, or an aliphatic polyamine residue of the following formula:

wherein $R^6$ is an alkyl residue having 7–25 carbon atoms, Y is a direct linkage or a bivalent group of formula:

and z is an integer of 1 to 4; B is an alkylene residue, an alkylene residue interrupted in its alkylene chain through one or more ether oxygen atoms, or a bivalent cycloaliphatic, aromatic or araliphatic residue; and $R^1$ is selected from the group of hydrogen, straight or branched chain alkyl residues having 1–6 carbon atoms, or straight or branched chain alkyl residues having 1–6 carbon atoms and which are phenyl substituted;

(ii) about 1–80% by weight of a coemulsifier comprising at least one polyalkylene polyamine group of the following formula:

  (II)

wherein the $R^1$ group and n are as defined above, and y is an integer of from 1–6, and where in coemulsifier (ii) the polyalkylene-polyamine-group of formula (II) is bonded to a structure of the following formula:

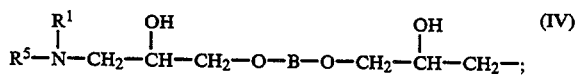  (IV)

wherein $R^5$ is a long chain alkyl residue having 7–25 carbon atoms or an aliphatic polyamine residue of the following formula:

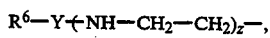

wherein $R^6$ is an alkyl residue having 7–25 carbon atoms, Y is a direct linkage or a bivalent group of formula:

z is an integer of 1 to 4; B is an alkylene residue or an alkylene residue interrupted through one or more ether oxygen atoms, or a bivalent cycloaliphatic, aromatic or araliphatic residue; and $R^1$ is selected from the group of hydrogen, straight chain or branched alkyl residues having 1–6 carbon atoms, and phenyl substituted alkyl radicals comprising 1–6 carbon atoms in the alkyl moieties;

(iii) about 5–80% by weight of at least one bis(-diamine)-diepoxide-adduct comprising at least two amino-alcohol groups of the following formula:

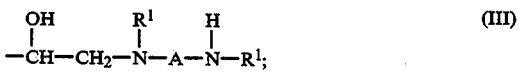  (III)

wherein the $R^1$ groups are as defined above, and A is an alkylene residue, cycloalkylene residue, a polyalkylene-polyether-residue, or a bivalent residue comprising alkyl groups and cycloalkyl and/or aromatic groups, and where in the bis(diamine)-diepoxide adduct (iii) the two groups of formula (III) are bonded to a bivalent structure of the following formula:

  (V);

wherein B is an alkylene residue or an alkylene residue, the carbon chains of which are interrupted through one or more ether oxygen atoms, or a bivalent cycloaliphatic, aromatic or araliphatic residue, and wherein the two groups of formula (III) bonded to said bivalent structure of formula (V), have the same structure, or a different structure.

* * * * *